US008103559B2

(12) United States Patent
Bhogal et al.

(10) Patent No.: US 8,103,559 B2
(45) Date of Patent: Jan. 24, 2012

(54) MAINTENANCE OF GROUP SHARED INVENTORIES IN A VIRTUAL UNIVERSE

(75) Inventors: Kulvir S. Bhogal, Fort Worth, TX (US);
Rick A. Hamilton, II, Charlottesville, VA (US); Clifford A. Pickover, Yorktown Heights, NY (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 12/032,464

(22) Filed: Feb. 15, 2008

(65) Prior Publication Data
US 2009/0210449 A1    Aug. 20, 2009

(51) Int. Cl.
*G06Q 10/00* (2006.01)

(52) U.S. Cl. ............. 705/28; 705/26.1; 715/700; 718/1; 345/419

(58) Field of Classification Search .................. None
See application file for complete search history.

(56) References Cited

U.S. PATENT DOCUMENTS

| | | | |
|---|---|---|---|
| 5,615,373 A | 3/1997 | Ho | |
| 6,476,830 B1 | 11/2002 | Farmer et al. | 715/769 |
| 6,753,857 B1 * | 6/2004 | Matsuura et al. | 345/419 |
| 6,941,184 B2 | 9/2005 | Ebert | |
| 7,069,228 B1 | 6/2006 | Rose et al. | |
| 7,257,552 B1 | 8/2007 | Franco | |
| 7,277,896 B2 | 10/2007 | Matsubara et al. | |
| 7,587,338 B2 * | 9/2009 | Owa | 705/26.1 |
| 7,666,095 B2 | 2/2010 | Van Luchene | 463/29 |
| 7,713,116 B2 | 5/2010 | Keam et al. | 463/1 |
| 8,018,462 B2 | 9/2011 | Bhogal et al. | |
| 2002/0002541 A1 | 1/2002 | Williams | |
| 2002/0029179 A1 | 3/2002 | Gruber et al. | |
| 2002/0052756 A1 | 5/2002 | Lomangino | |

(Continued)

FOREIGN PATENT DOCUMENTS
WO    WO 9607151 A1 *    3/1996

OTHER PUBLICATIONS

Kulvir S. Bhogal et al., U.S. Patent Application entitled "Maintenance of Group Shared Inventories in a Virtual Universe," filed Feb. 11, 2008, U.S. Appl. No. 12/028,918.

(Continued)

*Primary Examiner* — Luna Champagne
(74) *Attorney, Agent, or Firm* — Schmeiser, Olsen & Watts; Mark Vallone (57) ABSTRACT

Generally speaking, systems, methods and media for maintenance of group shared inventories in a virtual universe are disclosed. Embodiments of the method may include receiving usage information for one or more inventory items each shared by a group having a plurality of users and storing the received usage information. Embodiments may also include analyzing the usage information for at least one shared inventory item and performing an action based on the analysis of the usage information. The action performed may include archiving, deleting, changing the price for, or adding to a list of included inventory items the shared inventory item. Further embodiments may include determining whether a rule based on group usage is satisfied and performing the action accordingly. Further embodiments may also include analyzing the usage information to determine trends of usage, comparing the determined usage trends to an established heuristic, and performing an action as a result.

23 Claims, 5 Drawing Sheets

U.S. PATENT DOCUMENTS

| | | | |
|---|---|---|---|
| 2002/0059120 A1 | 5/2002 | Milton | |
| 2002/0107701 A1 | 8/2002 | Batty et al. | |
| 2005/0021353 A1 | 1/2005 | Aviles et al. | |
| 2005/0261980 A1 | 11/2005 | Hadi | |
| 2007/0033279 A1 | 2/2007 | Battat et al. | |
| 2007/0052702 A1* | 3/2007 | Trotta et al. | 345/419 |
| 2007/0075993 A1* | 4/2007 | Nakanishi et al. | 345/419 |
| 2007/0118420 A1* | 5/2007 | Jung et al. | 705/10 |
| 2008/0022137 A1* | 1/2008 | Ginter et al. | 713/194 |
| 2008/0109910 A1 | 5/2008 | Day et al. | |
| 2008/0204448 A1* | 8/2008 | Dawson et al. | 345/419 |
| 2009/0158161 A1 | 6/2009 | Gibbs et al. | 715/733 |

OTHER PUBLICATIONS

Kulvir S. Bhogal et al., U. S. Patent Application entitled "Pack Avatar for Shared Inventory in a Virtual Universe," filed Feb. 11, 2008, U.S. Appl. No. 12/029,132.

Kulvir S. Bhogal et al., U. S. Patent Application entitled "Shared Inventory Item Donation in a Virtual Universe," filed Feb. 11, 2008, U.S. Appl. No. 12/029,194.

Kulvir S. Bhogal et al., U. S. Patent Application entitled "Tracking of Shared Inventory in a Virtual Universe," filed Feb. 15, 2008, U.S. Appl. No. 12/032,488.

Ortiz Roman, Denisse Y., Non-Final Office Action: mail date Aug. 10, 2009; published by the USPTO in utility U.S. Appl. No. 12/028,918, pages—17.

Applicant's attorney Erik Osterrieder, Response to Non-Final Office Action of U.S. Appl. No. 12/028,918, Jul. 12, 2010, Austin, TX, USA.

Final Office Action of U.S. Appl. No. 12/028,918, Aug. 5, 2010, Alexandria, VA, USA.

Applicant's attorney Erik Osterrieder, Response to Non-Final Office Action of U.S. Appl. No. 12/029,194, Aug. 5, 2010, Austin, TX, USA.

Fan, Shiow-Jy, Non-Final Office Action; mail date May 7, 2010; published by the USPTO in utility U.S. Appl. No. 12/029,194, pages—16.

Ortiz Roman, Denisse Y., Non-Final Office Action: mail date Apr. 16, 2010; published by the USPTO in utility U.S. Appl. No. 12/028,918, pages—16.

Kulvir S. Bhogal et al., Amendment Accompanying RCE, mail date Feb. 23, 2010, published by Applicants in utility U.S. Appl. No. 12/028,918, pages—13.

Final Office Action of U.S. Appl. No. 12/028,918, Aug. 5, 2010, USPTO, Alexandria, VA, USA.

Jeffrey Schubert, Preliminary Amendment, U.S. Appl. No. 12/028,918, Nov. 5, 2010, Austin, TX, USA.

Non-Final Office Action of U.S. Appl. No. 12/029,132, Feb. 11, 2011, USPTO, Alexandria, VA, USA.

Final Office Action of U.S. Appl. No. 12/029,194, Sep. 29, 2010, USPTO, Alexandria, VA, USA.

Jeffrey Schubert, Preliminary Amendment, U.S. Appl. No. 12/029,194, Jan. 31, 2011, Austin, TX, USA.

Non-Final Office Action of U.S. Appl. No. 12/032,488, Aug. 18, 2010, USPTO, Alexandria, VA, USA.

Jeffrey Schubert, Response to Non-Final Office Action, U.S. Appl. No. 12/032,488, Nov. 18, 2010, Austin, TX, USA.

Notice of Non-Complaint Amendment of U.S. Appl. No. 12/032,488, Feb. 4, 2011, USPTO, Alexandria, VA, USA.

Blizzard Entertainment: World of Warcraft (Internet Archived Content: Guild Banks found at www.worldofwarcraft.com/info/basics/guildbanks.html) dated Feb. 4, 2008.

Office Action (Mail Date Jan. 7, 2011) for U.S. Appl. No. 12/029,132, filed Feb. 11, 2008; Confirmation No. 8207.

Final Office Action (Mail Date May 17, 2011) for U.S. Appl. No. 12/032,488, filed Feb. 15, 2008; Confirmation No. 4465.

Notice of Allowance (Mail Date May 11, 2011) for U.S. Appl. No. 12/029,132, filed Feb. 11, 2008; Confirmation No. 8207.

Notice of Appeal (Filed Sep. 16, 2011) for U.S. Appl. No. 12/032,488; Filing Date Feb. 15, 2008; Confirmation No. 4465.

Notice of Allowance (Mail Date Nov. 21, 2011) for U.S. Appl. No. 12/029,194; Filing Date Feb. 11, 2008; Confirmation No. 8336.

* cited by examiner

MAINTENANCE OF GROUP SHARED INVENTORIES IN A VIRTUAL UNIVERSE

FIELD OF INVENTION

The present invention is in the field of data processing systems and, in particular, to systems, methods and media for maintenance of group shared inventories in a virtual universe.

BACKGROUND

Computer systems are well known in the art and have attained widespread, use for providing computer power to many segments of today's modern society. As advances in semiconductor processing and computer architecture continue to push the performance of computer hardware higher, more sophisticated computer software has evolved to take advantage of the higher performance of the hardware, resulting in computer systems that continue to increase in complexity and power. Computer systems have thus evolved into extremely sophisticated devices that may be found in many different settings. Computer systems are often connected to the internet or other broad-based network in order to communicate with other computer systems, access information or other resources, or perform various tasks associated with business, personal banking, electronic commerce transactions, or other endeavors.

One application for computer systems that is increasing in importance is for use in accessing virtual universes (VUs), which are also known as virtual worlds and virtual world environments (VWEs). A VU represents a real or imaginary place using graphics, images, video, auditory data, or other sensory data to define a representation on a computer system to one or more users. The hardware and software that together create a VU provide the ability for users to interact with the VU in various ways. VUs commonly allow for multiple users to simultaneously interact with the VU, allowing the users to thus interact with each other within the VU and form a community. Current VUs such as Second Life® by Linden lab or There® by Makena Technologies provide an interactive, three dimensional (3D) online digital world with hundreds of thousands of users accessing the world via the Internet. In these graphical VUs, users typically are represented by an avatar within the online world, and the users may command their avatar to move within the VU, communicate with other users via their avatars, etc., and thus interact with the virtual world. VUs typically allow users (using a client program on their computer system) to use various tools to view, navigate, and modify the virtual world as well as participate in its virtual economy.

VU user typically have an inventory of items that they own, and these inventory items may be bought, sold, traded, etc. during operation of the VU. Items in a typical inventory may include clothing, virtual pets, vehicles, electronic media (e.g., music files), or other possessions. Each inventory item may represent a piece of code or other data which may be rendered in some fashion to the user during a session in the VU. Clothing inventory, for example, may be rendered as clothing for the user's avatar while a virtual dog, in another example, may render as an automated avatar that follows the user's avatar within the VU. The contents of a user's inventory are typically displayed in a hierarchical manner similar to an operating system's display of folders, subfolders, and files within a filesystem.

The current use of inventories within a VU is limited. Individuals must typically manage their own inventories, manually adding or deleting inventory items from their inventory. As inventory item lists can become quite extensive, such a process can be tedious for many users. Also, since each inventory item often has software code necessary to render it, the stored code results in significant storage and maintenance requirements within the VU as each instance of code is stored separately. Another problem with current inventory systems is that sharing of inventory items is not available. The lack of sharing may thus exacerbate the storage problems associated with inventory items as the code must be stored for each individual user. Managing inventories has thus become a major problem in VU space as are increasingly taken up by functional software, documents, and other such items that today reside on local drives.

SUMMARY OF THE INVENTION

The problems identified above are in large part addressed by systems, methods and media for maintenance of group shared inventories in a virtual universe. A method for maintaining group shared inventories in a virtual universe is disclosed. Embodiments of the method may include receiving usage information for one or more inventory items each shared by a group having a plurality of users and storing the received usage information for the one or more shared inventory items. Embodiments may also include analyzing the stored usage information for at least one shared inventory item and performing an action based on the analysis of the stored usage information for the at least one shared inventory item. Further embodiments may include where the action performed includes archiving, deleting, changing the price for, or adding to a list of included inventory items the at least one shared inventory item. Further embodiments may include determining whether a rule based on group usage is satisfied and perform the action based on the determination. Further embodiments may also include analyzing the usage information to determine trends of usage of the at least one shared inventory item and comparing the determined trends of usage to an established heuristic and performing an action as a result of the comparison.

Another embodiment provides a computer program product comprising a computer-useable medium having a computer readable program wherein the computer readable program, when executed on a computer, causes the computer to perform a series of operations for maintaining group shared inventories in a virtual universe. The series of operations generally includes receiving usage information for one or more inventory items each shared by a group having a plurality of users and storing the received usage information for the one or more shared inventory items. Embodiments may also include a series of operations for analyzing the stored usage information for at least one shared inventory item and performing an action based on the analysis of the stored usage information for the at least one shared inventory item. Further embodiments may include a series of operations for determining whether a rule based on group usage is satisfied and performing the action based on the determination. Further embodiments may also include a series of operations for analyzing the usage information to determine trends of usage of the at least one shared inventory item and comparing the determined trends of usage to an established heuristic and performing an action as a result of the comparison.

A further embodiment provides a data processing system having a machine accessible medium storing a plurality of program modules. Embodiments may include a virtual universe simulator interface module to facilitate communication to and from a virtual universe simulator and to receive usage information for one or more inventory items each shared by a group having a plurality of users. Embodiments may also include an inventory maintenance module to maintain group shared inventory items in a virtual universe. The inventory maintenance module may include an inventory analysis module to analyze usage information for at least one shared inventory item and to determine whether an action should be performed based on the analysis of the usage information for the at least one shared inventory item. The inventory maintenance module may also include an inventory modification module to perform an action in response to a determination by the inventory analysis module that performance of the action is required.

BRIEF DESCRIPTION OF THE DRAWINGS

Aspects of certain embodiments of the invention will become apparent upon reading the following detailed description and upon reference to the accompanying drawings in which like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The descriptions below are designed to make such embodiments obvious to a person of ordinary skill in the art.

Generally speaking, systems, methods and media for maintenance of group shared inventories in a virtual universe are disclosed. Embodiments of the method may include receiving usage information for one or more inventory items each shared by a group having a plurality of users and storing the received usage information for the one or more shared inventory items. Embodiments may also include analyzing the stored usage information for at least one shared inventory item and performing an action based on the analysis of the stored usage information for the at least one shared inventory item. Further embodiments may include where the action performed includes archiving, deleting, changing the price for, or adding to a list of included inventory items the at least one shared inventory item. Further embodiments may include determining whether a rule based on group usage is satisfied and performing the action based on the determination. Further embodiments may also include analyzing the usage information to determine trends of usage of the at least one shared inventory item and comparing the determined trends of usage to an established heuristic and performing an action as a result of the comparison.

The system and methodology of the depicted embodiments allow for effective and efficient maintenance of group shared inventories in a virtual universe. By managing shared inventory items for large groups of users, the disclosed system allows for an administrator or a member of the group to manage a shared inventory and thus eliminate the need for all members of the group to do so. The ability to manage and otherwise maintain the group shared inventory may reduce the time and inconvenience of maintaining a virtual inventory to users of a virtual universe. In some embodiments, many maintenance tasks (e.g., eliminating unused inventory items) may be automated to provide further efficiencies. Trends of usage of shared inventory items by members of the group may also be compared to established heuristics for further maintenance of the group shared inventory.

In general, the routines executed to implement the embodiments of the invention may be part of a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

While specific embodiments will be described below with reference to particular configurations of hardware and/or software, those of skill in the art will realize that embodiments of the present invention may advantageously be implemented with other substantially equivalent hardware, software systems, manual operations, or any combination of any or all of these. The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. Moreover, embodiments of the invention may also be implemented via parallel processing using a parallel computing architecture, such as one using multiple discrete systems (e.g., plurality of computers, etc.) or an internal multiprocessing architecture (e.g., a single system with parallel processing capabilities).

Aspects of embodiments of the invention described herein may be stored or distributed on computer-readable medium as well as distributed electronically over the Internet or over other networks, including wireless networks. Data structures and transmission of data (including wireless transmission) particular to aspects of the invention are also encompassed within the scope of the invention. Furthermore, the invention can take the form of a computer program product accessible from a computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Each software program described herein may be operated on any type of data processing system, such as a personal computer, server, etc. A data processing system suitable for storing and/or executing program code may include at least one processor coupled directly or indirectly to memory elements through a system bus. The memory elements may include local memory employed during execution of the program code, bulk storage, and cache memories which provide temporary storage of at least some program code in order to reduce the number of times code must be retrieved from bulk storage during, execution. Input/output (I/O) devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices through intervening private or public networks, including wireless networks. Modems, cable modems and Ethernet cards are just a few of the currently available types of network adapters.

Figure 1:
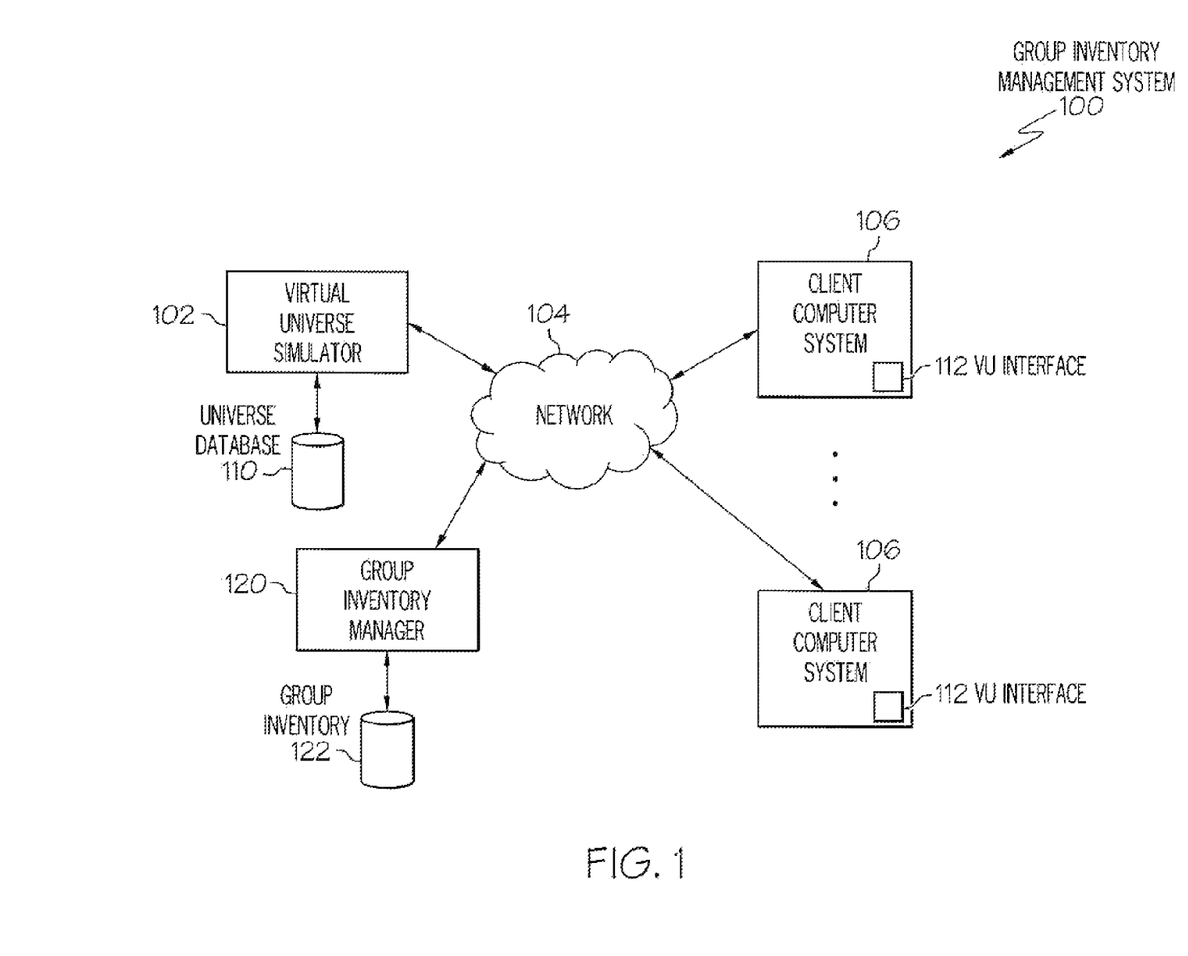
FIG. 1 depicts a group inventory management system with a virtual universe simulator, one or more client computer systems, and a group inventory manager according to some embodiments.

Turning now to the drawings, FIG. 1 depicts a group inventory management system 100 with a virtual universe (VU) simulator 102, one or more client computer systems 106, and a group inventory manager 120 according to some embodiments. In the depicted embodiment, the group inventory management system 100 includes a virtual universe simulator 102 in communication with a plurality of client computer systems 106 via network 104. The virtual universe simulator 102 and client computer systems 106 may also be in communication with a group inventory manager 120 via network 104. A group inventory database 122 may also be in communication with the group inventory manager 120. As will be described in more detail subsequently, the group inventory manager 120 may maintain a shared inventory for a group having a plurality of users of a virtual universe by performing a variety of tasks. The virtual shared inventory may be implemented by the group inventory manager 120 itself or by a separate component, such as the VU simulator 102, a virtual inventory manager (not shown), or other component. While only one VU simulator 102 is depicted, one of ordinary skill in the art will recognize that the group inventory manager 120 may maintain group shared inventory with either single or multiple VU simulators 102.

Inventory items may be any item that may be associated with a user in a virtual universe. Inventory items may each be comprised of one or more files, be part of a larger database, or be stored in any other fashion. In some embodiments, an inventory item may be a piece of software code that is renderable in a virtual universe. In other embodiments, inventory items may be represented as non-executable data that may be used by the VU to render the inventory item for the user when needed. Non-limiting examples of inventory items include graphics files, sound files, animations, electronic documents, video files, avatar clothing or accessories, avatar body parts, avatar tools or vehicles or other objects, avatar gestures, automated avatars, calling cards, landmarks (such as bookmarked locations) or other geographical information, items in a lost and found folder, note cards, photos and photo albums, scripts (e.g., macros to perform actions), textures, deleted items, or any other type of item. One of ordinary skill in the art will recognize that inventory items may include executable code, non-executable data, or any other type of information, and may also represent any type of item within a VU.

Virtual universe simulator 102 may be implemented on one or more servers or other computer systems (such as those described in relation to FIG. 2) adapted to implement all or part of a virtual universe. The VU simulator 102 may be implemented, for example, on one or more application servers such as International Business Machine's (IBM®'s) Web-Sphere® Application Server (WAS) that may serve as middleware to set up, operate, and integrate e-business applications across multiple computing platforms using Web technologies. The VU simulator 102 may provide a virtual universe to users by accessing stored information from a database and creating and operating a virtual universe based on the stored information. To accomplish this, the VU simulator 102 may render the virtual universe, including a user's inventory items (including shared inventory items), on the client computer system 102 so that the user can view or otherwise experience the virtual universe. An example VU simulator 102 may include massively multiplayer online games such as the Second Life® virtual world from Linden Lab or There®) by Makena Technologies.

A VU simulator 102 may also have a universe database 110 to store a variety of files used to create, maintain, and operate a virtual universe (collectively "environment information"), such as graphics files (e.g., buildings, avatars, landscapes, items, etc.), sound files (e.g., environmental sounds, spoken words, etc.) or text files (e.g., configuration information, descriptive information for objects, user information, etc.). The universe database 110 may also optionally include one or more shared inventory items and/or information relating to shared inventory items, such as item metadata, for members of a group. Shared inventory items, much like traditional inventory items, may be pieces of software code or other data that may be rendered within a virtual universe.

Users may utilize a client computer system 106 according to the present embodiments to access the virtual universe simulator 102 (and thus the virtual universe via network 104. Client computer system 106 may be a personal computer system or other computer system adapted to execute computer programs, such as a personal computer, workstation, server, notebook or laptop computer, desktop computer, personal digital assistant (PDA), mobile phone, wireless device, or set-top box, such as described in relation to FIG. 2. A user of the client computer system 106 may utilize a VU interface 112 to interacts with the VU operated by the virtual world simulator 102. VU interface 112 may be dedicated client software provided by the VU operator in some embodiments or it may alternatively be existing general software such as a browser.

Network 104 may be any type of data communications channel or combination of channels, such as the Internet, an intranet, a LAN, a WAN, an Ethernet network, a wireless network, telephone network, a proprietary network, or a broadband cables network. In one example, the Internet may serve as network 104 and the client computer systems 106, the group inventory manager 120, and the virtual universe simulator 102 may communicate via the Internet using known protocols. Those skilled in the art will recognize, however, that the invention described herein may be implemented utilizing any type or combination of data communications channel(s) without departure from the scope and spirit of the invention.

The group inventory manager 120, as will be described in more detail in relation to FIG. 3, may maintain shared inventory for one or more groups of users by adding, deleting, modifying, or otherwise changing shared inventory items in a group shared inventory list based on user or administrator requests, analysis of usage patterns, heuristics, or other methodologies. The group inventory manager 120 may analyze usage information for shared inventory items and, using the results of the analysis, may determine whether an action should be performed for the item and may then perform the action. The group inventory manager 120 may also manage preferences associated with the group (e.g., when to perform various actions, privileges of different group members, etc) and may also control editing of shared inventory items. The types of actions that may be performed may include archiving or deleting a shared inventory item (such as when it is not used sufficiently by group members), adding or removing a shared inventory item to a list of inventory items included with group membership, changing a price or other information for an inventory item, or any other action.

One of ordinary skill in the art will recognize that any type of analysis may be performed on the usage results of the shared inventory items for a group. In some embodiments, the group inventory manager 120 may determine whether a rule based on group usage is satisfied and perform an action based on that determination. In yet other embodiments, the group inventory manager 120 may determine trends of usage for one or more inventory items, compare the determined trends to an established heuristic, and either automatically perform an action or suggest an action (such as to an administrator) in response.

Group inventory database 122 may store shared inventory items and/or information relating to shared inventory items, such as item metadata or usage. Information, for use by the group inventory manager 120. The group inventory database 122 may be stored on any type or combination of storage devices, including volatile or non-volatile storage such as hard drives, storage area networks, memory, fixed or removable storage, or other storage devices. The group inventory database 122 may be wholly or partially a separate database from the universe database 110 or it may alternatively be integrated into the universe database 110.

The group inventory manager 120 may use any methodology to implement sharing of inventory items. In some embodiments, a virtual inventory manager (not shown) may be implemented to manage shared inventory items by facilitating the copying of a file from an inventory source to the virtual universe simulator when the shared inventory item is requested. In these embodiments, the virtual inventory manager may either be a separate program or integrated with the group inventory manager 120. The shared inventory items may be represented as pointers or references to the shared inventory item that is stored at a remote inventory source. The virtual inventory manager may be considered an abstraction layer between traditional means of connecting data among servers and a virtual universe simulator-specific graphical user interface (GUI). The means of connecting data among servers may include network file system (NFS) applications, structured query language (SQL), file transfer protocol (ftp), a services-oriented architecture (SOA) request, or other methodologies. A particular shared inventory item may be stored at any inventory source within the group inventory management system 100, including on a group inventory database 122 or a universe database 110. The virtual inventory manager may thus access a particular shared inventory item from its original location and provide the shared inventory item to the group inventory manager 120 and/or virtual universe simulator 102 so that a user may borrow the shared inventory item regardless of the original location of the shared inventory item.

Various non-limiting examples may serve to further illustrate the disclosed group inventory management system 100. In one example, an administrator or member of a group may establish a set of rules for shared inventory items of the group such that any inventory item that is not used during a specified time period (e.g., a month) is deleted while any shared inventory item that is used less than five times is archived. By applying such rules to group shared inventory, storage space within the VU may be improved and user's inventory lists de-cluttered, thus improving efficiency and performance. In another example, trends of usage of item are observed to assist human inventory managers in selecting new items to add. If, in one example, songs from a particular music group proved popular to borrow by members of a group, a human inventory manager may choose to offer a newly released song from the same music group with increased confidence that group members will enjoy it.

In another example, the group inventory manager 120 may analyze the usage of shared inventory items by members of a group to assess whether the shared inventory items should be offered to other users. If, for example, an inventory item is currently shared by 20 users and used by each at least once a day, the group inventory manager 120 may offer the inventory item to be shared to other users because the item is likely to be useful or popular. Such an offer to new potential sharers may be made by any prior art offering methods such as by instant message, e-mail, or other notification means. The item may also be offered by placing an indication of the shared inventory item in the new user's inventory. The indication of the item to be offered for sharing may be the actual item (perhaps visually indicated as not yet shared) or may be information about the actual item offered for sharing, such as a description of the item that includes a listing of the number or nature of other users who are currently sharing the item.

Figure 2:
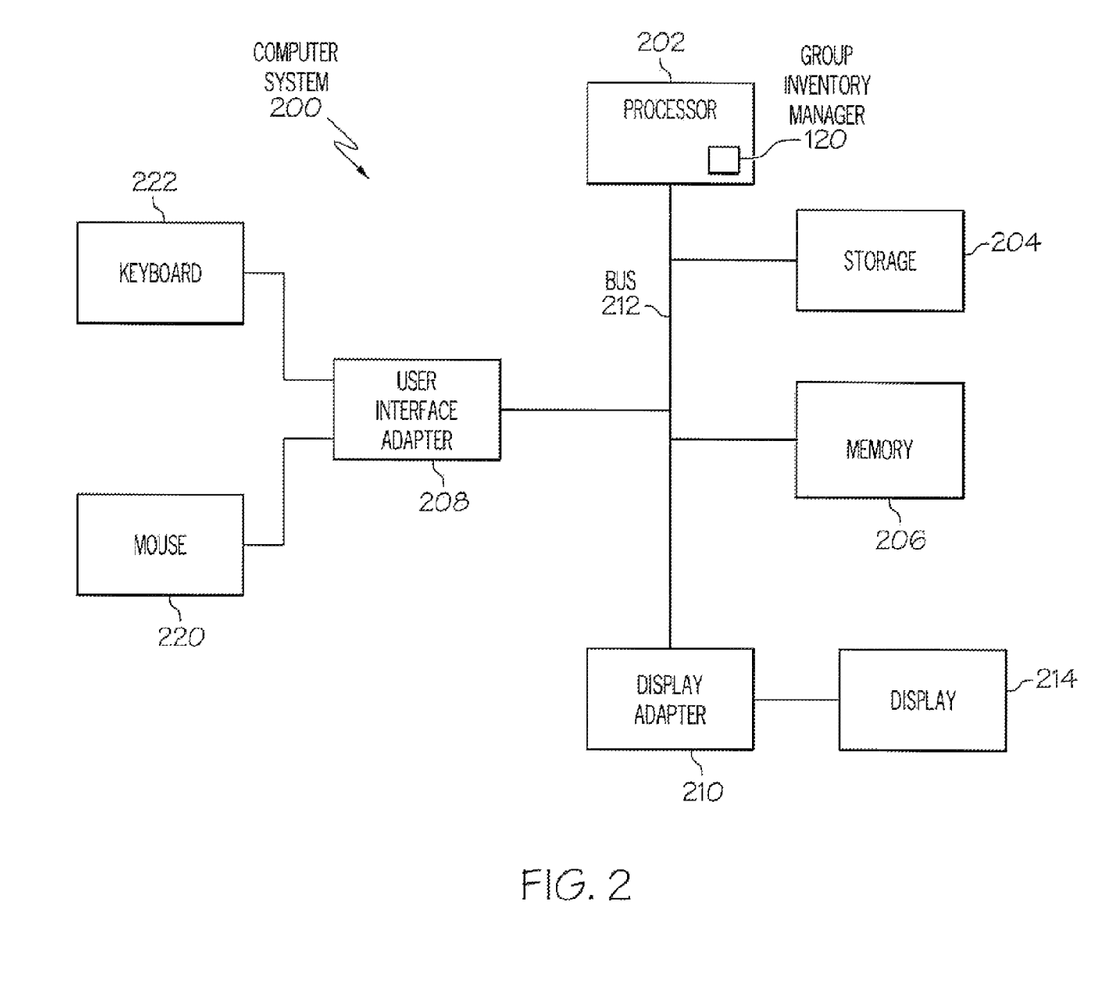
FIG. 2 depicts a block diagram of one embodiment of a computer system suitable for use as a component of the group inventory management system, such as a client computer system or a data processing system to execute the group inventory manager.

FIG. 2 depicts a block diagram of one embodiment of a computer system 200 suitable for use as a component of the group inventory management system 100, such as a client computer system 106 or a data processing system to execute the group inventory manager 120. Other possibilities for the computer system 200 are possible, including a computer having capabilities other than those ascribed herein and possibly beyond those capabilities, and they may, in other embodiments, be any combination of processing devices such as workstations, servers, mainframe computers, notebook or laptop computers, desktop computers, PDAs, mobile phones, wireless devices, set-top boxes, or the like. At least certain of the components of computer system 200 may be mounted on a multi-layer planar or motherboard (which may itself be mounted on the chassis) to provide a means for electrically interconnecting the components of the computer system 200.

In the depicted embodiment, the computer system 200 includes a processor 202, storage 204, memory 206, a user interface adapter 208, and a display adapter 210 connected to a bus 212 or other interconnect. The bus 212 facilitates communication between the processor 202 and other components of the computer system 200, as well as communication between components. Processor 202 may include one or more system central processing units (CPUs) or processors to execute instructions, such as an IBM® PowerPC™ processor, an Intel Pentium™ processor, an Advanced Micro Devices Inc. processor or any other suitable processor. The processor 202 may utilize storage 204, which may be nonvolatile storage such as one or more hard drives, tape drives, diskette drives, CD-ROM drive, DVD-ROM drive, or the like. The processor 202 may also be connected to memory 206 via bits 212, such as via a memory controller hub (MCH). System memory 206 may include volatile memory such as random access memory (RAM) or double data rate (DDR) synchronous dynamic random access memory (SDRAM). In the disclosed systems, for example, a processor 202 may execute instructions to perform functions of the group inventory manager 120, such as by accessing and analyzing group shared inventory item usage information, and may temporarily or permanently store information during its calculations or results after calculations in storage 204 or memory 206. All or part of the group inventory manager 120, for example, may be stored in memory 206 during execution of its routines. Similarly, processor 202 may execute instructions for the VU interface 112 when computer system 200 is used for a client computer system 106.

The user interface adapter 208 may connect the processor 202 with user interface devices such as a mouse 220 or keyboard 222. The user interface adapter 208 may also connect with other types of user input devices, such as touch pads, touch sensitive screens, electronic pens, microphones, etc. A user of a client computer system 106 who belongs to a group having shared inventory item and who is attempting access to a shared inventory item, for example, may utilize the keyboard 222 and mouse 220 to interact with their computer system. The bus 212 may also connect the processor 202 to a display 214, such as an LCD display or CRT monitor, via the display adapter 210.

Figure 3:
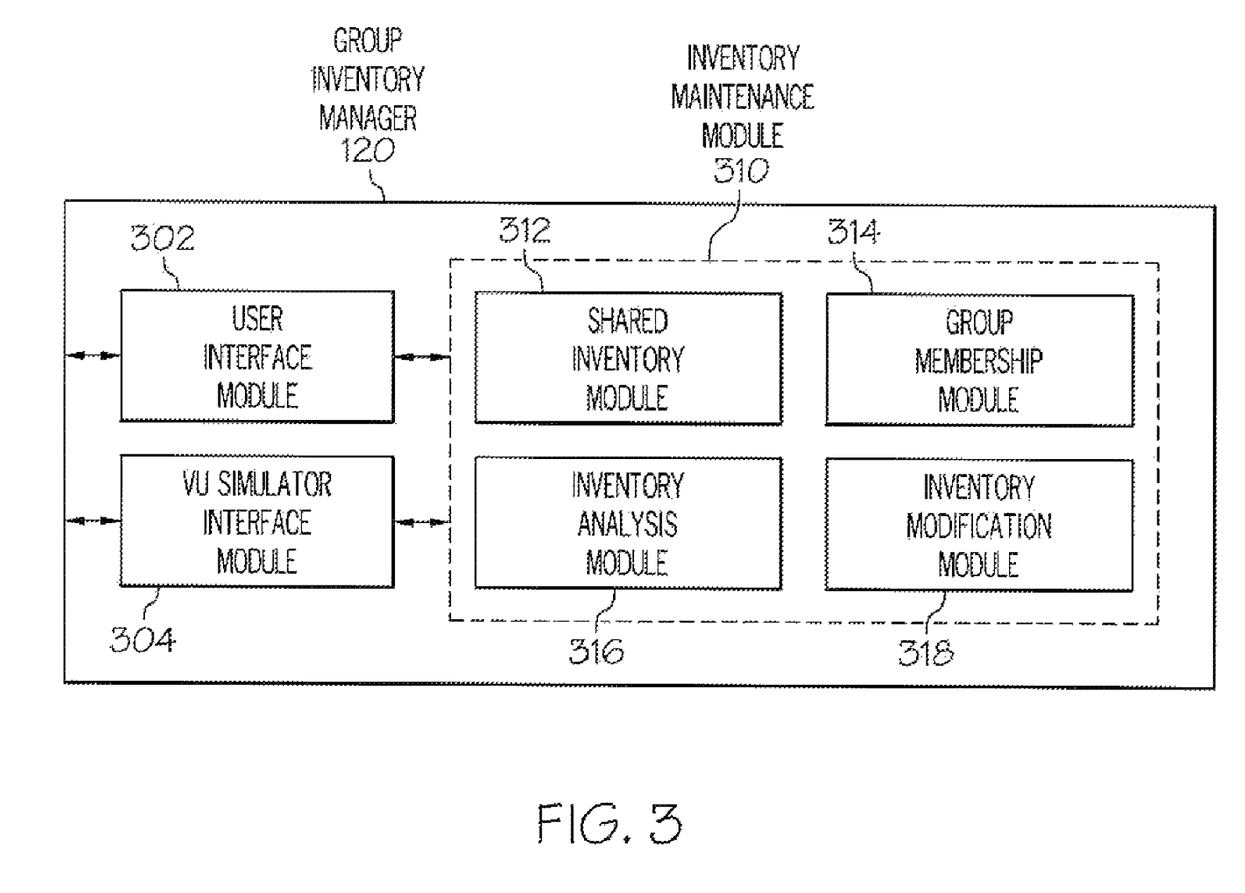
FIG. 3 depicts a conceptual illustration of software components of a group inventory manager according to some embodiments.

FIG. 3 depicts a conceptual illustration of software components of a group inventory manager 120 according to some embodiments. The group inventory manager 120 may be implemented on a computer system 200 such as described in relation to FIG. 2, including on one or more servers. The group inventory manager 120 may also alternatively be implemented as part of a virtual universe simulator 102 (i.e., executing on the same servers). As described previously and also in relation to FIGS. 4 and 5, the group inventory manager 120 may maintain shared inventory items for one or more groups of VU users. The group inventory manager 120 may include components to assist it with its functions, including a user interface module 302, a VU simulator interface module 304, and an inventory maintenance module 310. The inventory maintenance module 310 may include its own components, such as a shared inventory module 312, a group membership module 314, an inventory analysis module 316, and an inventory modification module 318. One of ordinary skill in the art will recognize that the functionality of each component of the group inventory manager 120 may be combined or divided in any fashion and the description herein is merely intended to be illustrative of some embodiments.

The user interface module 302 may facilitate communication to and from a user, including transmitting and receiving information associated with configuring an inventory item for sharing, requesting addition or removal to a group, request a change in group membership, changing preferences, or other information. For example, a user may request (and the user interface module 302 may receive) parameters for the sharing of a particular inventory item by members of group, such as by limiting the other users within the group who can access it, the length of time they may use it, or other limitation. The VU simulator interface module 304 may facilitate communication to and from virtual universe simulators 102, such as by receiving notification of user sessions being established, requests for shared inventory items, or requests to modify group shared inventory item inventory. The VU simulator interface module 304 may also transmit shared inventory items or metadata to a virtual universe simulator 102, transmit indications of whether access to group shared inventory items is permitted, transmit modifications to group shared inventory items, or other information. The user interface module 302 may optionally be part of the VU simulator interface module 306 in the event that communications with users are all completed via the VU simulator 102.

The inventory maintenance module 310, and its components, may communicate with the two interface modules to assist it in performing its task of maintaining group shared inventory items in a virtual universe (or multiple virtual universes). The inventory maintenance module 310 may maintain shared inventory for one or more groups of users by adding, deleting, modifying, or otherwise changing shared inventory items in a group shared inventory list based on user or administrator requests, analysis of usage patterns, heuristics, or other methodologies. The shared inventory module 312 may provide for sharing of inventory items for the group, such as by interfacing with a virtual inventory manager (as described in relation to FIG. 1) or by managing shared inventory items for the group and passing such items to the VU simulator 102 as appropriate.

The group membership module 314 may manage membership in one or more groups each with one or more shared inventory items. Management of membership may include adding or deleting users from a group, changing the membership terms and conditions for a user (e.g., giving a user edit privileges to the group shared inventory), or changing the preferences for shared inventory items (how long each may be loaned, which purpose it may be borrowed and used, etc.). The group membership module 314 may also manage preferences associated with the group, such as when to perform various actions in response to analysis of the group shared inventory (e.g., deleting an item when not used by group users for a month).

The inventory analysis module 316 may analyze usage information for shared inventory items and, using the results of the analysis, may determine whether an action should be performed for the item. The inventory modification module 318 may perform the actual actions, including edits, in response to a determination by the inventory analysis module 316. The actions may either be automatically performed in response to a determination or presented as an option or recommendation to a human inventory manager who may then request execution of the action. The types of actions that may be performed may include archiving or deleting a shared inventory item (such as when it is not used sufficiently by group members), adding or removing a shared inventory item to a list of inventory items included with group membership, changing a price, or other information for an inventory item, offering an item to other users for sharing based on assessed usage, or any other action. As described previously, analysis may include determining whether a rule based on group usage is satisfied, determining trends of usage for one or more inventory items and comparing the determined trends to an established heuristic, or other actions.

Figure 4:
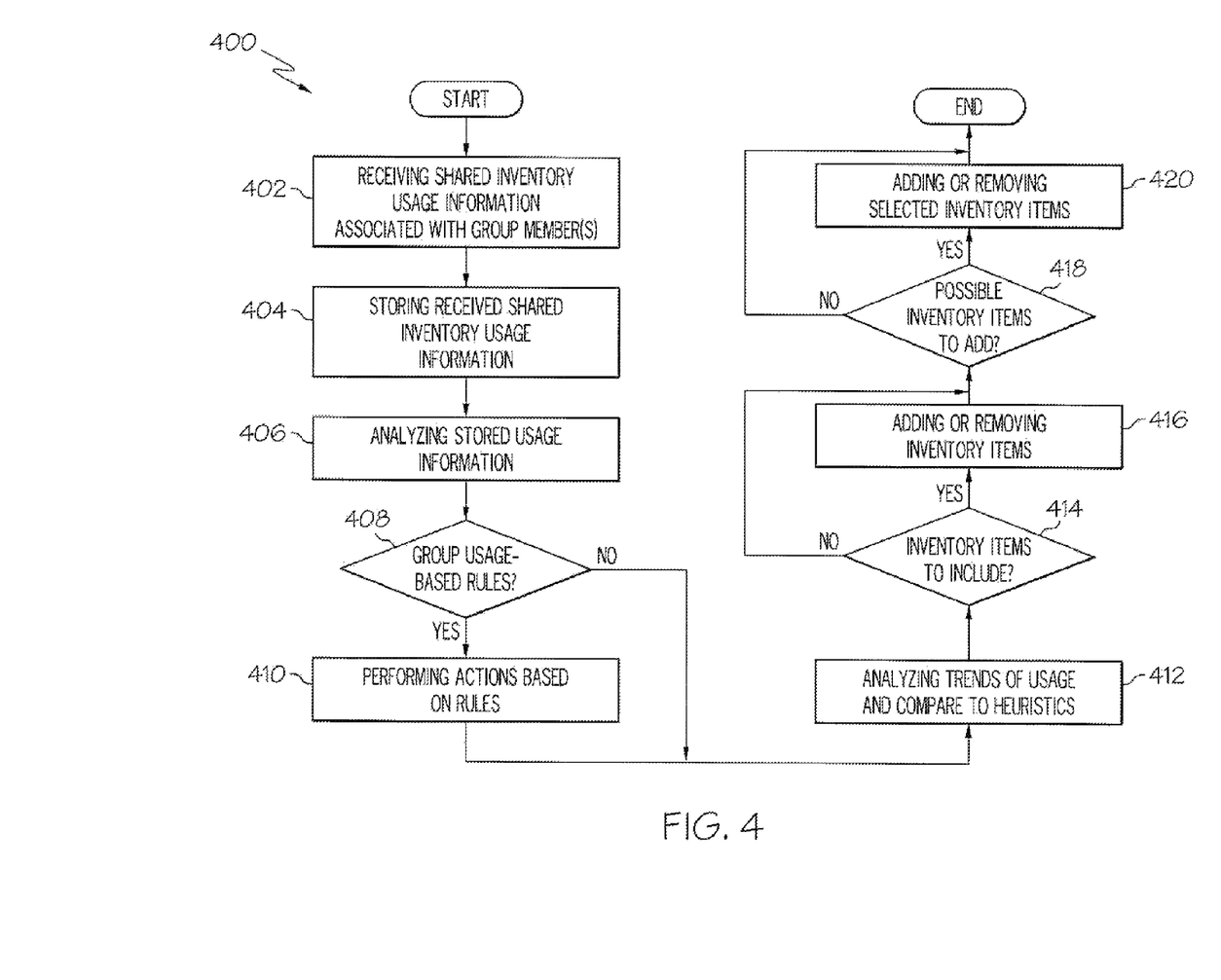
FIG. 4 depicts an example of a flow chart for maintaining shared inventory items for a group of users in a virtual universe according to some embodiments.

FIG. 4 depicts an example of a flow chart 400 for maintaining shared inventory items for a group of users in a virtual universe according to some embodiments. The method of flow chart 400 may be performed, in one embodiment, by the group inventory manager 120 and its components. Flow chart 400 begins with element 402, receiving shared inventory usage information associated with one or more group members. The usage information may be received from a VU stimulator 102 or other source and may include any type of information about a user's usage of a shared inventory item, including when and if a user borrowed a shared inventory item, feedback from the user, how long a user borrowed the item, where in the VU the user used the item, or any other type of information. As the shared inventory usage information is received, it may be stored at element 404, such as in the group inventory database 122. In some embodiments, usage information for a particular group of users and their shared inventory may be stored together in one database.

The group inventory manager 120 may next at element 406 analyze the stored shared inventory usage information, as described previously. Analysis may be performed at any time and in any fashion, such as automatically at a pre-specified time or after defined intervals or upon request by an administrator or group member, etc. If the analysis includes the application of group usage-based rules at decision block 408, the group inventory manager 120 may perform actions based on the group usage-based rules at element 410. Any shared inventory items, for example, not used by group members in the last month may be archived or deleted in order to save space and reduce clutter in inventory lists. In another example, frequently-used shared inventory items may be placed at the beginning of group members' inventory lists as such items are most likely to be useful for a particular user.

The group inventory manager 120 may also at optional element 412 analyze trends of usage of various shared inventory items and compare those trends to established heuristics. A heuristic may be considered a technique designed to solve a problem that ignores whether the solution can be proven to be correct but which instead usually produces a good solution. Heuristics are typically intended to gain computational performance or conceptual simplicity, potentially at the cost of accuracy. For maintenance of shared inventory an example heuristic might be that if particular shared inventory items are popular it is likely that another, similar inventory item would also be popular and thus should be included in a group's inventory.

Application of heuristics to the analyzed trends of usage may result in automated and enhanced method for maintaining shared inventory for a group. If at decision block 414 the comparison between the analyzed trends of usage and the established heuristics results in a determination that one or more other shared inventory items should be included on a group list or removed from such list, the group inventory manager 120 may at element 416 automatically add or delete the inventory items from the list as appropriate. Similarly, if at decision block 418 the comparison between the analyzed trends of usage and the established heuristics results in a determination that one or more other shared inventory items should be included on a group list or removed from the list, the group inventory manager 120 may at element 420 recommend to a human inventory manager that the items should be added or deleted as appropriate, after which the method may terminate. At element 420, the selected items may be added and/or deleted upon request of the human inventory manager.

Figure 5:
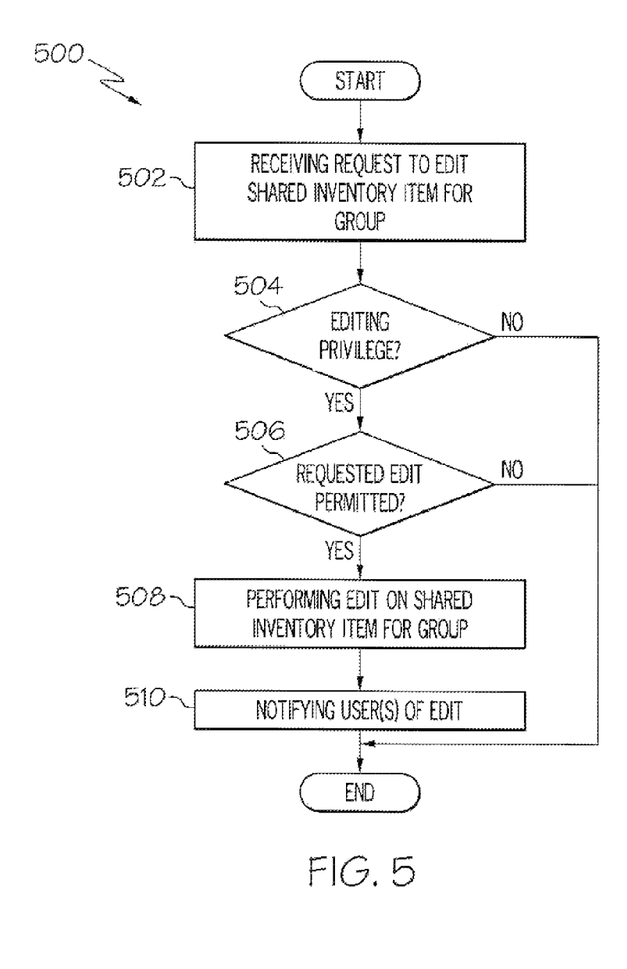
FIG. 5 depicts an example of a flow chart for controlling edits of shared inventory items for a group of users in a virtual universe according to some embodiments.

FIG. 5 depicts an example of a flow chart 500 for controlling edits of shared inventory items for a group of users in a virtual universe according to some embodiments. The method of flow chart 500 may be performed, in one embodiment, by the group inventory manager 120 and its components. Flow chart 500 begins with element 502, receiving a request to edit one or more shared inventory items associated with a group. The request may be received from a user who belongs to the group, an administrator, a content owner for a particular inventory item, or other individual. If, at decision block 504, it is determined that the requesting individual does not have editing privilege for the group and/or the particular shared inventory item, editing is refused the method terminates.

If the individual does have editing privileges, the gap inventory manager 120 may at decision block 506 determine if the requested edit is permitted. In some embodiments, individuals may only have the rights to perform certain types of edits (e.g., user may add but not delete). Rules may be placed on the group of inventory items to determine the level of openness for group editing, such as by dictating if users may add items, delete items, create new folders, delete folders, or request other actions. If the individual does not have editing privileges for the requested action, editing is again denied and the method terminates. If the requested edit is permitted, the group inventory manager 120 may at element 508 perform the requested edit on the group shared inventory item. Edits may also be performed on multiple items, such as by adding a new restriction on all items in a group shared inventory. One or more users or other individuals may also be notified at element 510 of the edit, such as by notifying the requesting user that the edit was performed, notifying other users, an administrator, or a content owner that a change was made, etc., after which the method terminates.

The disclosed methodology may thus provide for a restricted editing option where only an individual or small group of individuals are permitted to perform maintenance tasks on behalf of a group. This may be particularly advantageous for groups with unsophisticated users or with users with competing interest. The disclosed methodology may also provide for an open editing option that allows any members of the group (and specified others) to perform edits so that group management can be achieved. This embodiment may be considered similar to a 'wiki' web page that allows for community-based editing of content. As one of ordinary skill in the art will recognize, any type of methodology for controlling edits may be accomplished consistent with the disclosed embodiments.

It will be apparent to those skilled in the art having the benefit of this disclosure that the present invention contemplates methods, systems, and media for maintaining shared inventory items for a group of users in a virtual universe. It is understood that the form of the invention shown and described in the detailed description and the drawings are to be taken merely as examples. It is intended that the following claims be interpreted broadly to embrace all the variations of the example embodiments disclosed.

What is claimed is:

1. A method for maintaining group shared inventories in a virtual universe, the method comprising:

receiving, by a computer system comprising a group inventory manager and one or more processors coupled to memory, usage information for one or more inventory items each shared by a group having a plurality of users, wherein the group inventory manager comprises software components for maintaining shared inventory, and further wherein the one or more shared inventory items comprise one or more copies, pointers, or references;

storing the received usage information for the one or more shared inventory items;

analyzing the stored usage information for at least one of the one or more shared inventory items; and performing an action based on the analysis of the stored usage information for the at least one of the one or more shared inventory items.

2. The method of claim 1, wherein the performing the action comprises archiving the at least one of the one or more shared inventory items.

3. The method of claim 1, wherein the performing the action comprises deleting the at least one of the one or more shared inventory items.

4. The method of claim 1, wherein the performing the action comprises adding the at least one of the one or more shared inventory items to a list of included inventory items.

5. The method of claim 1, wherein the performing the action comprises changing a price for the at least one of the one or more shared inventory items.

6. The method of claim 1, wherein the performing the action comprises changing usage conditions for the at least one of the one or more shared inventory items.

7. The method of claim 1, wherein the performing the action comprises offering the at least one of the one or more shared inventory items to a user not currently sharing the at least one of the one or more shared inventory items.

8. The method of claim 1, further comprising:
wherein the analyzing the stored usage information for the at least one of the one or more shared inventory items comprises analyzing the stored usage information to determine whether a rule based on group usage is satisfied; and
wherein further the performing the action based on the analysis of the stored usage information for the at least one of the one or more shared inventory items comprises performing the action based on whether the rule based on group usage is satisfied.

9. The method of claim 1, further comprising:
wherein the analyzing the stored usage information for the at least one of the one or more shared inventory items comprises analyzing the stored usage information to determine trends of usage of the at least one of the one or more shared inventory items;
comparing the determined trends of usage of the at least one of the one or more shared inventory items to an established heuristic; and
wherein further the performing the action based on the analysis of the stored usage information for the at least one of the one or more shared inventory items comprises performing the action automatically in response to the determined trend of usage satisfying the established heuristic.

10. The method of claim 1, further comprising:
wherein the analyzing the stored usage information for the at least one of the one or more shared inventory items comprises analyzing the stored usage information to determine trends of usage of the at least one of the one or more shared inventory items;
comparing the determined trends of usage of the at least one of the one or more shared inventory items to an established heuristic; and
wherein further the performing the action based on the analysis of the stored usage information for the at least one of the one or more shared inventory items comprises performing the action in response to a request from a user.

11. The method of claim 1, further comprising receiving a request from a user to edit a shared inventory item of the one or more shared inventory items and determining whether the user has editing privilege for the shared inventory item to be edited.

12. A computer program product for maintaining group shared inventories in a virtual universe, the computer program product comprising:
a computer readable storage device;
first program instructions to receive, by a group inventory manager, usage information for one or more inventory items each shared by a group having a plurality of users, wherein the group inventory manager comprises software components for maintaining shared inventory, and further wherein the one or more shared inventory items comprise one or more copies, pointers, or references;
second program instructions to store the received usage information for the one or more shared inventory items;
third program instructions to analyze the stored usage information for at least one of the one or more shared inventory items;
fourth program instructions to perform an action based on the analysis of the stored usage information for the at least one of the one or more shared inventory items; and
wherein the first, second, third, and fourth program instructions are stored on the computer readable storage device.

13. The computer program product of claim 12, further comprising:
wherein the third program instructions to analyze the stored usage information for the at least one of the one or more shared inventory items comprises fifth program instructions to analyze the stored usage information to determine whether a rule based on group usage is satisfied;
wherein the fourth program instructions to perform the action based on the analysis of the stored usage information for the at least one of the one or more shared inventory items comprises sixth program instructions to perform further the action based on the analysis and whether the rule based on group usage is satisfied; and
wherein the fifth and sixth program instructions are stored on the computer readable storage device.

14. The computer program product of claim 12, further comprising:
wherein the third program instructions to analyze the stored usage information for the at least one of the one or more shared inventory items comprise fifth program instructions to analyze the stored usage information to determine trends of usage of the at least one shared inventory item;
sixth program instructions to compare the determined trends of usage of the at least one of the one or more shared inventory items to an established heuristic;
wherein the fourth program instructions to perform the action based on the analysis of the stored usage information for the at least one of the one or more shared inventory items comprise seventh program instructions to perform further the action based on the analysis and automatically in response to the determined trend of usage satisfying the established heuristic; and
wherein the fifth, sixth, and seventh program instructions are stored on the computer readable storage device.

15. The computer program product of claim 12, further comprising:
wherein the third program instructions to analyze the stored usage information for the at least one of the one or more shared inventory items comprise fifth program instructions to analyze the stored usage information to determine trends of usage of the at least one shared inventory item;
sixth program instructions to compare the determined trends of usage of the at least one of the one or more shared inventory items to an established heuristic;
wherein the fourth program instructions to perform the action based on the analysis of the stored usage information for the at least one of the one or more shared inventory items comprise seventh program instructions to perform further the action based on the analysis and in response to a request from a user; and wherein the fifth, sixth, and seventh program instructions are stored on the computer readable storage device.

16. A system for maintaining group shared inventories in a virtual universe, the system comprising:

a processor, a computer readable memory and a computer readable storage device;

first program instructions to receive, by a group inventory manager, usage information for one or more inventory items each shared by a group having a plurality of users, wherein the group inventory manager comprises software components for maintaining shared inventory, and further wherein the one or more shared inventory items comprise one or more copies, pointers, or references;

second program instructions to store the received usage information for the one or more shared inventory items;

third program instructions to analyze the stored usage information for at least one of the one or more shared inventory items;

fourth program instructions to perform an action based on the analysis of the stored usage information for the at least one of the one or more shared inventory items; and wherein the first, second, third, and fourth program instructions are stored on the computer readable storage device for execution by the processor via the computer readable memory.

17. The system of claim 16, further comprising:

wherein the third program instructions to analyze the stored usage information for the at least one of the one or more shared inventory items comprises fifth program instructions to analyze stored usage information to determine whether a rule based on group usage is satisfied;

wherein the fourth program instructions to perform the action based on the analysis of the stored usage information for the at least one of the one or more shared inventory items comprise sixth program instructions to perform further the action based on the analysis and whether the rule based on group usage is satisfied; and wherein the fifth and sixth program instructions are stored on the computer readable storage device for execution by the processor via the computer readable memory.

18. The system of claim 16, further comprising:

wherein the third program instructions to analyze the stored usage information for the at least one of the one or more shared inventory items comprise fifth program instructions to analyze the stored usage information to determine trends of usage of the at least one of the one or more shared inventory items;

sixth program instructions to compare the determined trends of usage of the at least one of the one or more shared inventory items to an established heuristic;

wherein the fourth program instructions to perform the action based on the analysis of the stored usage information for the at least one of the one or more shared inventory items comprise seventh program instructions to perform further the action based on the analysis and automatically in response to the determined trend of usage satisfying the established heuristic; and wherein the fifth, sixth, and seventh program instructions are stored on the computer readable storage device for execution by the processor via the computer readable memory.

19. The system of claim 16, further comprising:

wherein the third program instructions to analyze the stored usage information for the at least one of the one or more shared inventory items comprise fifth program instructions to analyze the stored usage information to determine trends of usage of the at least one of the one or more shared inventory items;

sixth program instructions to compare the determined trends of usage of the at least one of the one or more shared inventory items to an established heuristic;

wherein the fourth program instructions to perform the action based on the analysis of the stored usage information for the at least one of the one or more shared inventory items comprise seventh program instructions to perform further the action based on the analysis and in response to a request from a user; and wherein the fifth, sixth, and seventh program instructions are stored on the computer readable storage device for execution by the processor via the computer readable memory.

20. The system of claim 16, further comprising fifth program instructions to receive a request from a user to edit a shared inventory item of the one or more shared inventory items and determining whether the user has editing privilege for the shared inventory item to be edited; and wherein the fifth program instructions are stored on the computer readable storage device for execution by the processor via the computer readable memory.

21. The method of claim 1, further comprising notifying at least one user of the plurality of users of the action for the at least one of the one or more shared inventory items.

22. The computer program product of claim 12, further comprising fifth program instructions to notify at least one user of the plurality of users of the action for the at least one of the one or more shared inventory items subsequent to execution of the fourth program instructions; and wherein the fifth program instructions are stored on the computer readable storage device.

23. The system of claim 16, further comprising fifth program instructions to notify at least one user of the plurality of users of the action for the at least one of the one or more shared inventory items subsequent to execution of the fourth program instructions; and wherein the fifth program instructions are stored on the computer readable storage device for execution by the processor via the computer readable memory.

* * * * *